(12) United States Patent
Mellet et al.

(10) Patent No.: US 8,409,045 B1
(45) Date of Patent: Apr. 2, 2013

(54) MULTI-SPEED TRANSMISSION

(75) Inventors: Edward W. Mellet, Rochester Hills, MI (US); Scott William Heitzenrater, Orion, MI (US); Andrew W. Phillips, Rochester, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/428,825

(22) Filed: Mar. 23, 2012

(51) Int. Cl.
*F16H 3/44* (2006.01)

(52) U.S. Cl. ........................................ 475/280

(58) Field of Classification Search ................. 475/269, 475/280, 296, 330
See application file for complete search history.

(56) References Cited

U.S. PATENT DOCUMENTS

| | | | |
|---|---|---|---|
| 6,176,803 B1 | 1/2001 | Meyer et al. | |
| 6,342,026 B1 | 1/2002 | Takagi et al. | |
| 6,547,688 B2 | 4/2003 | Takagi et al. | |
| 6,558,287 B2 | 5/2003 | Hayabuchi et al. | |
| 6,634,980 B1 | 10/2003 | Ziemer | |
| 6,663,528 B1 | 12/2003 | Haka | |
| 6,736,751 B1 | 5/2004 | Usoro et al. | |
| 6,743,139 B1 | 6/2004 | Usoro et al. | |
| 6,743,140 B1 | 6/2004 | Lee et al. | |
| 6,743,142 B1 | 6/2004 | Lee et al. | |
| 6,743,143 B1 | 6/2004 | Usoro et al. | |
| 6,743,144 B1 | 6/2004 | Lee et al. | |
| 6,746,357 B1 | 6/2004 | Usoro et al. | |
| 6,752,736 B1 | 6/2004 | Lee et al. | |
| 6,755,765 B2 | 6/2004 | Usoro et al. | |
| 6,758,784 B2 | 7/2004 | Lee et al. | |
| 6,758,787 B2 | 7/2004 | Usoro et al. | |
| 6,764,424 B1 | 7/2004 | Usoro et al. | |
| 6,764,425 B2 | 7/2004 | Lee et al. | |
| 6,764,426 B2 | 7/2004 | Usoro et al. | |
| 6,767,307 B1 | 7/2004 | Lee et al. | |
| 6,802,795 B2 | 10/2004 | Miyazaki et al. | |
| 6,811,512 B2 | 11/2004 | Usoro et al. | |
| 6,837,823 B2 | 1/2005 | Lee et al. | |
| 6,852,059 B2 | 2/2005 | Lee et al. | |
| 6,960,149 B2 | 11/2005 | Ziemer | |
| 6,984,187 B2 | 1/2006 | Biermann | |
| 6,991,578 B2 | 1/2006 | Ziemer | |
| 7,011,597 B2 | 3/2006 | Haka | |
| 7,014,589 B2 | 3/2006 | Stevenson | |
| 7,018,319 B2 | 3/2006 | Ziemer | |
| 7,101,305 B2 | 9/2006 | Tabata et al. | |
| 7,128,683 B2 | 10/2006 | Oguri et al. | |
| 7,163,484 B2 | 1/2007 | Klemen | |
| 8,303,454 B1 * | 11/2012 | Shim et al. | 475/280 |
| 2005/0090362 A1 | 4/2005 | Abe et al. | |
| 2006/0019791 A1 | 1/2006 | Baldwin | |
| 2006/0270513 A1 | 11/2006 | Klemen | |
| 2006/0270514 A1 | 11/2006 | Oguri et al. | |
| 2006/0270516 A1 | 11/2006 | Klemen | |

(Continued)

OTHER PUBLICATIONS

Pending U.S. Appl. No. 13/206,862, filed Aug. 10, 2011, by Mellet et al. All pages.

*Primary Examiner* — David D Le
*Assistant Examiner* — David J Hlavka

(57) ABSTRACT

A transmission is provided having an input member, an output member, at least four planetary gear sets, a plurality of coupling members and a plurality of torque transmitting devices. Each of the planetary gear sets includes first, second and third members. The torque transmitting devices include clutches and brakes actuatable in combinations of two to establish at least eleven forward gear ratios and one reverse gear ratio.

20 Claims, 3 Drawing Sheets

U.S. PATENT DOCUMENTS

2009/0118058 A1* 5/2009 Suh ............... 475/275
2010/0331138 A1* 12/2010 Phillips ........................ 475/278
2012/0172173 A1* 7/2012 Wittkopp et al. ............. 475/277
2012/0302393 A1* 11/2012 Seo et al. ...................... 475/276

* cited by examiner

| GEAR STATE | GEAR RATIO | RATIO STEP | TORQUE TRANSMITTING ELEMENTS | | | | | | |
|---|---|---|---|---|---|---|---|---|---|
| | | | 34 | 32 | 36 | 38 | 28 | 26 | 30 |
| REV | -2.943 | | X | | | | | X | |
| N | | -0.64 | | | | | | | |
| 1ST | 4.584 | | X | | X | | | | |
| 2ND | 2.964 | 1.55 | | X | X | | | | |
| 3RD | 2.413 | 1.23 | | | X | | | | X |
| 4TH | 1.912 | 1.26 | | | X | | | X | |
| 5TH | 1.446 | 1.32 | | | X | | X | | |
| 6TH | 1.000 | 1.45 | | | | | X | X | |
| 7TH | 0.836 | 1.20 | X | | | X | | | |
| 8TH | 0.746 | 1.12 | | X | | | X | | |
| 9TH | 0.599 | 1.25 | | | | X | X | | |
| 10TH | 0.541 | 1.11 | | X | | X | | | |
| 11TH | 0.491 | 1.10 | | | | X | | X | |
| 12TH | 0.440 | 1.12 | | | | X | | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||||||
|---|---|---|---|---|---|---|---|---|---|
| | | | 134 | 132 | 136 | 138 | 128 | 126 | 130 |
| REV | -2.943 | | X | | | | | X | |
| N | | -0.64 | | | | | | | |
| 1ST | 4.584 | | X | | X | | | | |
| 2ND | 2.964 | 1.55 | | X | X | | | | |
| 3RD | 2.413 | 1.23 | | | X | | | | X |
| 4TH | 1.912 | 1.26 | | | X | | | X | |
| 5TH | 1.446 | 1.32 | | | X | | X | | |
| 6TH | 1.000 | 1.45 | | | | | X | X | |
| 7TH | 0.902 | 1.11 | X | | | X | | | |
| 8TH | 0.746 | 1.21 | | X | | | X | | |
| 9TH | 0.632 | 1.18 | | | | X | X | | |
| 10TH | 0.583 | 1.08 | X | | | X | | | |
| 11TH | 0.526 | 1.11 | | | | X | | X | |
| 12TH | 0.475 | 1.11 | | | | X | | | X |

X = ON - ENGAGED CARRYING TORQUE
O = ON - ENGAGED NOT CARRYING TORQUE

MULTI-SPEED TRANSMISSION

FIELD

The invention relates generally to a multiple speed transmission, and more particularly, to a transmission having a plurality speeds, planetary gear sets, and torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and brakes.

In one variation, which may be combined with or separate from the other variations described herein, a transmission has an input member, an output member, first, second, third and fourth planetary gear sets each having first, second, and third members, at least five interconnecting members, and at least seven torque transmitting mechanisms. The first interconnecting member continuously interconnects the third member of the first planetary gear set with the third member of the fourth planetary gear set. The second interconnecting member continuously interconnects the second member of the first planetary gear set with the third member of the third planetary gear set. The third interconnecting member continuously interconnects the first member of the first planetary gear set with the second member of the second planetary gear set. The fourth interconnecting member continuously interconnects the third member of the second planetary gear set with the second member of the third planetary gear set. The fifth interconnecting member continuously interconnects the first member of the second planetary gear set with the second member of the fourth planetary gear set. The seven torque transmitting mechanisms are each selectively engageable to interconnect at least one of the first, second, and third members with at least one other of the first, second, third members and a stationary member. The seven torque transmitting mechanisms are selectively engageable in combinations of at least two to establish at least eleven forward speed ratios and at least one reverse speed ratio between the input member and the output member.

In another variation, which may be combined with or separate from the other variations described herein, a transmission includes a stationary member, at least four planetary gear sets (each having a sun gear member, a planetary gear carrier member, and a ring gear member), an input member continuously connected for common rotation with the second sun gear member and the fourth planetary gear carrier member, an output member continuously connected for common rotation with the first planetary gear carrier member and the third ring gear member, at least three interconnecting members, at least three clutches, and at least four brakes. The first interconnecting member continuously interconnects the first sun gear member with the fourth sun gear member. The second interconnecting member continuously interconnects the first ring gear member with the second planetary gear carrier member. The third interconnecting member continuously interconnects the second ring gear member with the third planetary gear carrier member. The first clutch is selectively engageable to interconnect the third sun gear member with the input member, the second sun gear member, and the fourth planetary gear carrier member. The second clutch is selectively engageable to interconnect the second ring gear member and the third planetary gear carrier member with the input member, the second sun gear member, and the fourth planetary gear carrier member. The third clutch is selectively engageable to interconnect the third planetary gear carrier member and the second ring gear member with the output member, the third ring gear member, and the first planetary gear carrier member. The first brake is selectively engageable to interconnect the third sun gear member with the stationary member. The second brake is selectively engageable to interconnect the third planetary gear carrier member and the second ring gear member with the stationary member. The third brake is selectively engageable to interconnect the first sun gear member and the fourth sun gear member with the stationary member. The fourth brake is selectively engageable to interconnect the fourth ring gear member with the stationary member. The first, second, and third clutches and the first, second, third, and fourth brakes are selectively engageable in combinations of at least two to establish at least twelve forward speed ratios and at least one reverse speed ratio between the input member and the output member.

In yet another variation, which may be combined with or separate from the other variations described herein, a transmission includes a stationary member, at least four planetary gear sets (each having a sun gear member, a planetary gear carrier member, and a ring gear member), an input member continuously connected for common rotation with the second sun gear member and the fourth planetary gear carrier member, an output member continuously connected for common rotation with the first planetary gear carrier member and the third ring gear member, at least three interconnecting members, at least three clutches, and at least four brakes. The first interconnecting member continuously interconnects the first sun gear member with the fourth sun gear member. The second interconnecting member continuously interconnects the first ring gear member with the second planetary gear carrier member. The third interconnecting member continuously interconnects the second ring gear member with the third planetary gear carrier member. The first clutch is selectively engageable to interconnect the third sun gear member with the input member, the second sun gear member, and the fourth planetary gear carrier member. The second clutch is selectively engageable to interconnect the second ring gear member and the third planetary gear carrier member with the input member, the second sun gear member, and the fourth planetary gear carrier member. The third clutch is selectively engageable to interconnect the third planetary gear carrier member and the second ring gear member with the third sun gear member. The first brake is selectively engageable to interconnect the third sun gear member with the stationary member. The second brake is selectively engageable to interconnect the third planetary gear carrier member and the second ring gear member with the stationary member. The third brake is selectively engageable to interconnect the first sun gear member and the fourth sun gear member with the stationary member. The fourth brake is selectively engageable to interconnect the fourth ring gear member with the stationary member. The first, second, and third clutches and the first, second, third, and fourth brakes are selectively engageable in combinations of at least two to establish at least twelve forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figures 3, 4:
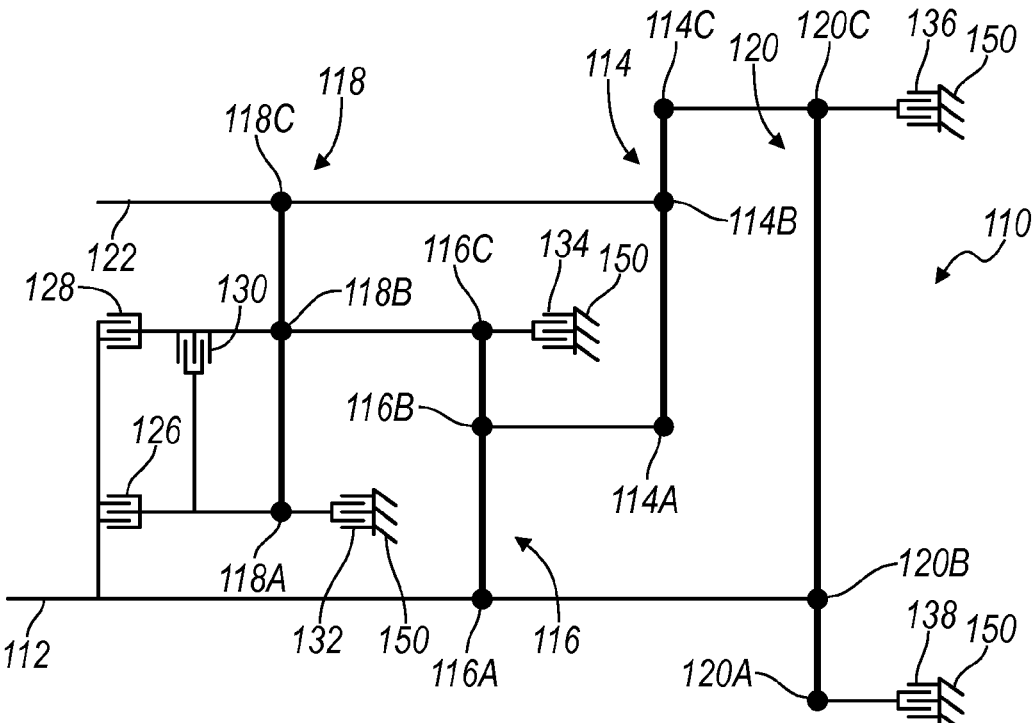
FIG. 3 is a truth table presenting an example of a state of engagement of various torque transmitting elements in forward and reverse speeds or gear ratios of the transmissions illustrated in FIGS. 1-2.
FIG. 4 is a lever diagram of another embodiment of a transmission according to the principles of the present invention.
Figures 5, 6:
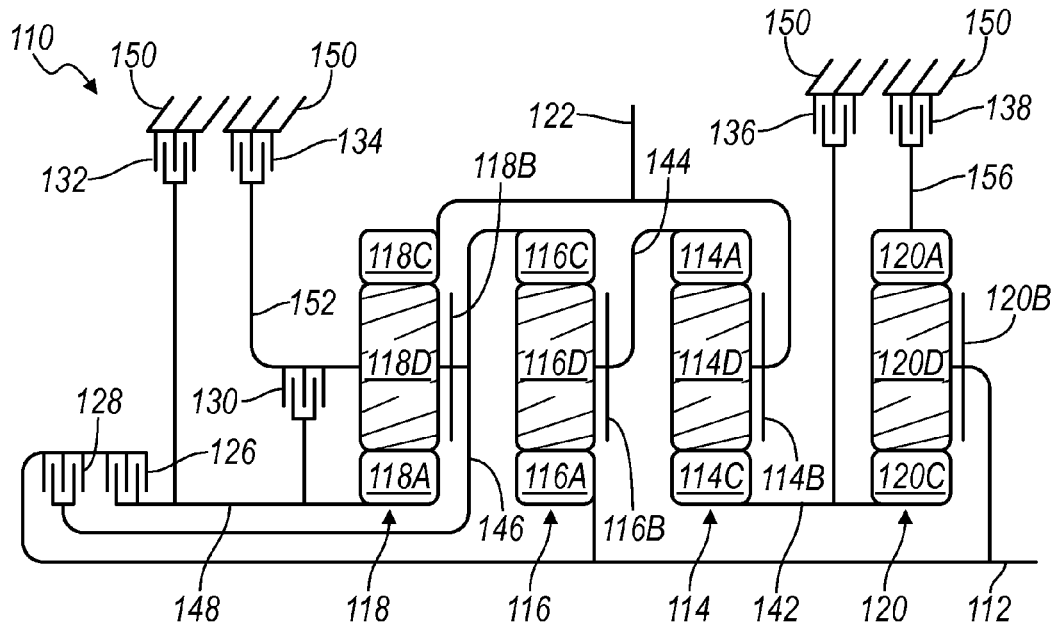

FIG. 5. is a diagrammatic illustration of a variation of the transmission of FIG. 4 according to the principles of the present invention; and FIG. 6 is a truth table presenting an example of a state of engagement of various torque transmitting elements in forward and reverse speeds or gear ratios of the transmission illustrated in FIGS. 4-5.

DETAILED DESCRIPTION

The following description is merely exemplary in nature and is not intended to limit the present disclosure, application, or uses.

In some forms of the present disclosure, an eleven or twelve speed transmission is provided in a relatively small package by achieving eleven or twelve forward speeds with four planetary gear sets, four brakes, and three clutches. In other variations, however, additional brakes, clutches, planetary gear sets, or other components may be added.

At the outset, it should be appreciated that the embodiments of the eleven or twelve speed automatic transmissions of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a first component or element of a first planetary gear set is permanently coupled to a second component or element of a second planetary gear set. A second component or element of the first planetary gear set is permanently coupled to a third component or element of a third planetary gear set. A third component or element of the first planetary gear set is permanently coupled to a third component or element of a fourth planetary gear set. A third component or element of the second planetary gear set is permanently coupled to a second component or element of the third planetary gear set. A first component or element of the second planetary gear set is permanently coupled to a second component or element of the fourth planetary gear set.

Figure 1:
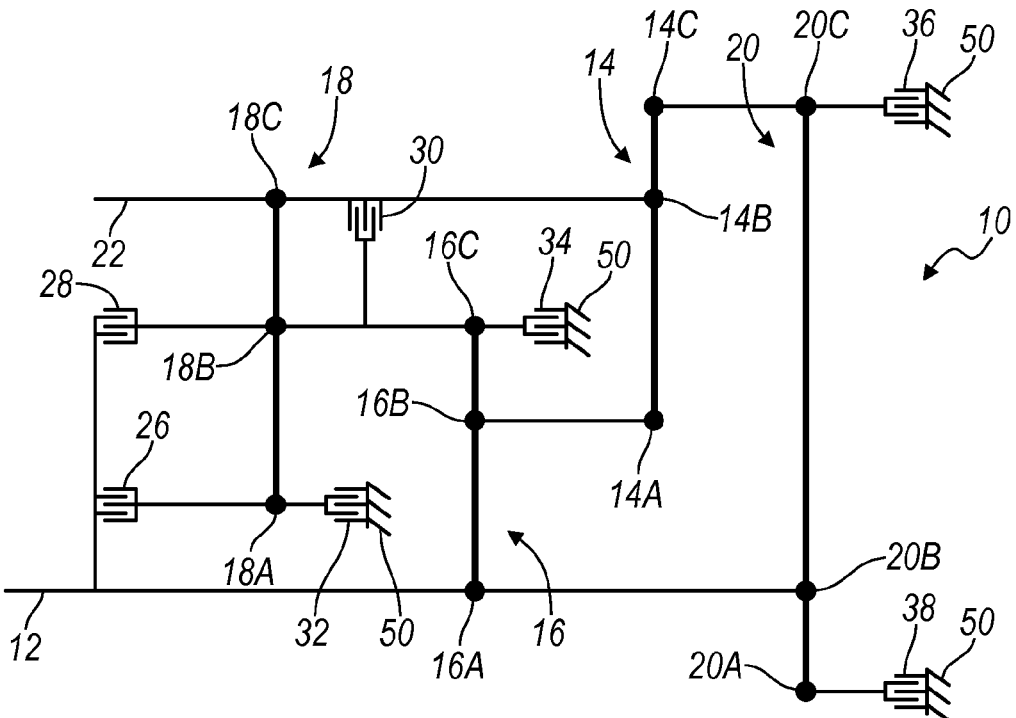
FIG. 1 is a lever diagram of an embodiment of a transmission according to the principles of present invention.

Referring now to FIG. 1, an embodiment of a twelve speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 16A of the second planetary gear set 16 and the second node 20B of the fourth planetary gear set 20. The output member 22 is continuously coupled to the third node 18C of the third planetary gear set 18 and the second node 14B of the first planetary gear set 14.

The first node 14A of the first planetary gear set 14 is coupled to the second node 16B of the second planetary gear set 16. The second node 14B of the first planetary gear set 14 is coupled to the third node 18C of the third planetary gear set 18. The third node 14C of the first planetary gear set 14 is coupled to the third node 20C of the fourth planetary gear set 20.

The first node 16A of the second planetary gear set 16 is coupled to the second node 20B of the fourth planetary gear set 20. The third node 16C of the second planetary gear set 16 is coupled to second node 18B of the third planetary gear set 18.

A first clutch 26 selectively connects the input member or shaft 12, the first node 16A of the second planetary gear set 16, and the second node 20B of the fourth planetary gear set 20 with the first node 18A of the third planetary gear set 18. A second clutch 28 selectively connects the input member or shaft 12, the first node 16A of the second planetary gear set 16, and the second node 20B of the fourth planetary gear set 20 with the second node 18B of the third planetary gear set 18 and the third node 16C of the second planetary gear set 16. A third clutch 30 selectively connects the output member or shaft 22, the third node 18C of the third planetary gear set 18, and the second node 14B of the first planetary gear set 14 with the third node 16C of the second planetary gear set 16 and the second node 18B of the third planetary gear set 18.

A first brake 32 selectively connects the first node 18A of the third planetary gear set 18 with a stationary member or transmission housing 50. A second brake 34 selectively connects the third node 16C of the second planetary gear set 16 and the second node 18B of the third planetary gear set 18 with the stationary member or transmission housing 50. A third brake 36 selectively connects the third node 14C of the first planetary gear set 14 and the third node 20C of the fourth planetary gear set 20 with the stationary member or transmission housing 50. A fourth brake 38 selectively connects the first node 20A of the fourth planetary gear set 20 with the stationary member or transmission housing 50.

Figure 2:
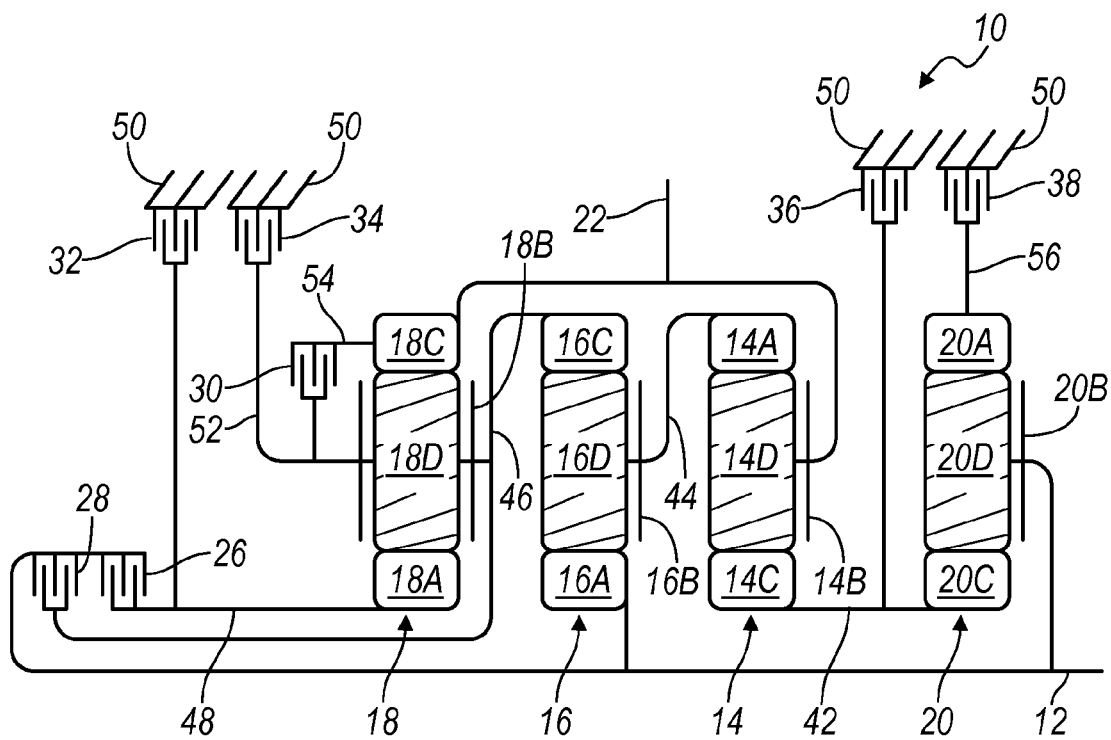
FIG. 2 is a diagrammatic illustration of a variation of the transmission of FIG. 1 according to the principles of the present invention.

Referring now to FIG. 2, a stick diagram presents a schematic layout of an embodiment of the twelve speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a first sun gear member 14C, a first ring gear member 14A, and a first planet gear carrier member 14B that rotatably supports a first set of planet gears 14D (only one of which is shown). The first planetary gear set 14 is a simple planetary gear set in this variation, but in other variations of the present invention, the first planetary gear set 14 could be a compound planetary gear set. The first sun gear member 14C is connected for common rotation with a first shaft or interconnecting member 42. The first ring gear member 14A is connected for common rotation with a second shaft or interconnecting member 44. The first planet carrier member 14B is connected for common rotation with the output shaft or member 22. The first planet gears 14D are each configured to intermesh with both the first sun gear member 14C and the first ring gear member 14A.

The second planetary gear set 16 includes a second sun gear member 16A, a second ring gear member 16C, and a second planet gear carrier member 16B that rotatably supports a second set of planetary gears 16D (only one of each is shown). The second planetary gear set 16 is a simple planetary gear set in this variation, but in other variations of the present invention, the second planetary gear set 16 could be a compound planetary gear set having more than one set of planetary gears supported by the carrier member 16B. The second sun gear member 16A is connected for common rotation with the input shaft or member 12. The second planet carrier member 16B is connected for common rotation with the second shaft or interconnecting member 44. The second ring gear member 16C is connected for common rotation with a third shaft or interconnecting member 46. The second set of planet gears 16D is configured to intermesh with both the second ring gear member 16C and the second sun gear member 16A.

The third planetary gear set 18 includes a third sun gear member 18A, a third ring gear member 18C, and a third planet gear carrier member 18B that rotatably supports a third set of planet gears 18D (only one of which is shown). In other words, the third planetary gear set 18 is a simple planetary gear set in this variation, but in other variations of the present invention, the third planetary gear set 18 could be a compound planetary gear set. The third sun gear member 18A is connected for common rotation with a fourth shaft or interconnecting member 48. The third planet carrier member 18B is connected for common rotation with the third shaft or interconnecting member 46 and a fifth shaft or interconnecting member 52. The third ring gear member 18C is connected for common rotation with the output shaft or member 22. In addition, the third ring gear member 18C is connected for common rotation with a sixth shaft or interconnecting member 54. The third planet gears 18D are each configured to intermesh with both the third sun gear member 18A and the third ring gear member 18C.

The fourth planetary gear set 20 includes a fourth sun gear member 20C, a fourth ring gear member 20A, and a fourth planet gear carrier member 20B that rotatably supports a fourth set of planet gears 20D (only one of which is shown). In other words, the fourth planetary gear set 20 is a simple planetary gear set in this variation, but in other variations of the present invention, the fourth planetary gear set 20 could be a compound planetary gear set. The fourth sun gear member 20C is connected for common rotation with the first shaft or interconnecting member 42. The fourth ring gear member 20A is connected for common rotation with a seventh shaft or interconnecting member 56. The fourth planetary gear carrier member 20B is connected for common rotation with the input shaft or member 12. The fourth planet gears 20D are each configured to intermesh with both the fourth sun gear member 20C and the fourth ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first, second, and third clutches 26, 28, 30 and the first, second, third, and fourth brakes 32, 34, 36, 38 allow for selective interconnection of the shafts or interconnecting members 42, 44, 46, 48, 52, 54, 56 of the planetary gear sets 14A-C, 16A-C, 18A-C, 20A-C, and the housing 50.

For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46. The third clutch 30 is selectively engageable to connect the fifth shaft or interconnecting member 52 with the sixth shaft or interconnecting member 54.

The first brake 32 is selectively engageable to connect the fourth shaft or interconnecting member 48 with the stationary element or the transmission housing 50 in order to restrict the member 48 from rotating relative to the transmission housing 50. The second brake 34 is selectively engageable to connect the fifth shaft or interconnecting member 52 with the stationary element or the transmission housing 50 in order to restrict the member 52 from rotating relative to the transmission housing 50. The third brake 36 is selectively engageable to connect the first shaft or interconnecting member 42 with the stationary element or the transmission housing 50 in order to restrict the member 42 from rotating relative to the transmission housing 50. The fourth brake 38 is selectively engageable to connect the seventh shaft or interconnecting member 56 with the stationary element or the transmission housing 50 in order to restrict the member 56 from rotating relative to the transmission housing 50. In turn, the gear elements connected to each of the connecting members are also connected or restricted accordingly.

Referring now to FIG. 2 and FIG. 3, the operation of the embodiment of the transmission 10 will be described. It will be appreciated that transmission 10 is capable of transmitting torque from the input shaft or member 12 to the output shaft or member 22 in eleven, twelve, or more forward speed torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34, third brake 36, and fourth brake 38), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. An "O" in the box means that a particular clutch or brake is engaged but not carrying torque (no "O's" are present in FIG. 3). Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the first clutch 26 and the second brake 34 are engaged or activated. The first clutch 26 connects the input shaft or member 12 with the fourth shaft or interconnecting member 48. The second brake 34 connects the fifth shaft or interconnecting member 52 with the stationary element or the transmission housing 50 in order to restrict the member 52 from rotating relative to the transmission housing 50, which restricts the third planetary carrier member 18B and the second ring gear member 16C from rotating relative to the transmission housing 50. Likewise, twelve forward ratios are achieved through different combinations of clutch and brake engagement, as shown in FIG. 3, by way of example.

Referring now to FIG. 4, another embodiment of a twelve speed transmission 110 is illustrated in a lever diagram format. The transmission 110 includes an input shaft or member 112, a first planetary gear set 114, a second planetary gear set 116, a third planetary gear set 118, a fourth planetary gear set 120, and an output shaft or member 122. Like the lever diagram of FIG. 1, in the lever diagram of FIG. 4, each of the planetary gear sets 114, 116, 118, 120 have first, second, and third nodes 114A-C, 116A-C, 118A-C, 120A-C.

The input member 112 is continuously coupled to the first node 116A of the second planetary gear set 116 and the second node 120B of the fourth planetary gear set 120. The output member 122 is continuously coupled to the third node 118C of the third planetary gear set 118 and the second node 114B of the first planetary gear set 114. The first node 114A of the first planetary gear set 114 is coupled to the second node 116B of the second planetary gear set 116. The second node 114B of the first planetary gear set 114 is coupled to the third node 118C of the third planetary gear set 118. The third node 114C of the first planetary gear set 114 is coupled to the third node 120C of the fourth planetary gear set 120.

The first node 116A of the second planetary gear set 116 is coupled to the second node 120B of the fourth planetary gear set 120. The third node 116C of the second planetary gear set 116 is coupled to second node 118B of the third planetary gear set 118.

A first clutch 126 selectively connects the input member or shaft 112, the first node 116A of the second planetary gear set 116, and the second node 120B of the fourth planetary gear set 120 with the first node 118A of the third planetary gear set 118. A second clutch 128 selectively connects the input member or shaft 112, the first node 116A of the second planetary gear set 116, and the second node 120B of the fourth planetary gear set 120 with the second node 118B of the third planetary gear set 118 and the third node 116C of the second planetary gear set 116. A third clutch 130 selectively connects the first node 118A of the third planetary gear set 118 with the second node 118B of the third planetary gear set 118 and the third node 116C of the second planetary gear set 116.

A first brake 132 selectively connects the first node 118A of the third planetary gear set 118 with a stationary member or transmission housing 150. A second brake 134 selectively connects the third node 116C of the second planetary gear set 116 and the second node 118B of the third planetary gear set 118 with the stationary member or transmission housing 150. A third brake 136 selectively connects the third node 114C of the first planetary gear set 114 and the third node 120C of the fourth planetary gear set 120 with the stationary member or transmission housing 150. A fourth brake 138 selectively connects the first node 120A of the fourth planetary gear set 120 with the stationary member or transmission housing 150.

Referring now to FIG. 5, a stick diagram presents a schematic layout of an embodiment of the twelve speed transmission 110 of FIG. 4, according to one form of the present invention. It should be understood that alternatively, other different stick diagrams could be used in conjunction with the lever diagram FIG. 4. In FIG. 5, the numbering from the lever diagram of FIG. 4 is carried over. The clutches and couplings are correspondingly presented whereas the nodes of the planetary gear sets now appear as components of planetary gear sets such as sun gears, ring gears, planet gears and planet gear carriers.

For example, like the stick diagram in FIG. 2, the stick diagram in FIG. 5 includes a first, second, third, and fourth planetary gear sets 114, 116, 118, 120, wherein each includes a sun gear member 114C, 116A, 118A, 120C, a planet carrier member 114B, 116B, 118B, 120B having planet gears 114D, 116D, 118D, 120D, and a ring gear member 114A, 116C, 118C, 120A. The planet gears 114D, 116D, 118D, 120D intermesh with both a sun gear member 114C, 116A, 118A, 120C and a ring gear member 114A, 116C, 118C, 120A, respectively. Each of the planetary gear sets 114, 116, 118, 120 are simple planetary gear sets in this variation, but in other variations of the present invention, one or more of the planetary gear sets 114, 116, 118, 120 could be compound planetary gear sets. The input shaft or member 112 is continuously connected to an input source, and the output shaft or member 122 is continuously connected with another output.

The first sun gear member 114C is connected for common rotation with a first shaft or interconnecting member 142. The first ring gear member 114A is connected for common rotation with a second shaft or interconnecting member 144. The first planet carrier member 114B is connected for common rotation with the output shaft or member 122.

The second sun gear member 116A is connected for common rotation with the input shaft or member 112. The second planet carrier member 116B is connected for common rotation with the second shaft or interconnecting member 144. The second ring gear member 116C is connected for common rotation with a third shaft or interconnecting member 146.

The third sun gear member 118A is connected for common rotation with a fourth shaft or interconnecting member 148. The third ring gear member 118C is connected for common rotation with the output shaft or member 122. The third planet carrier member 118B is connected for common rotation with the third shaft or interconnecting member 146 and a fifth shaft or interconnecting member 152.

The fourth sun gear member 120C is connected for common rotation with the first shaft or interconnecting member 142. The fourth ring gear member 120A is connected for common rotation with a sixth shaft or interconnecting member 156. The fourth planetary gear carrier member 120B is connected for common rotation with the input shaft or member 112.

The torque-transmitting mechanisms, including the first, second, and third clutches 126, 128, 130 and the first, second, third, and fourth brakes 132, 134, 136, 138 allow for selective interconnection of the shafts or interconnecting members, members of the planetary gear sets and the housing. For example, the first clutch 126 is selectively engageable to connect the input shaft or member 112 with the fourth shaft or interconnecting member 148. The second clutch 128 is selectively engageable to connect the input shaft or member 112 with the third shaft or interconnecting member 146. The third clutch 130 is selectively engageable to connect the fifth shaft or interconnecting member 152 with the fourth shaft of interconnecting member 148.

The first brake 132 is selectively engageable to connect the fourth shaft or interconnecting member 148 with the stationary element or the transmission housing 150. The second brake 134 is selectively engageable to connect the fifth shaft or interconnecting member 152 with the stationary element or the transmission housing 150. The third brake 136 is selectively engageable to connect the first shaft or interconnecting member 142 with the stationary element or the transmission housing 150. The fourth brake 138 is selectively engageable to connect the sixth shaft or interconnecting member 156 with the stationary element or the transmission housing 150.

Referring now to FIGS. 5-6, the operation of the illustrated embodiment of the transmission 110 will be described. The transmission 110 is capable of transmitting torque from the input shaft or member 112 to the output shaft or member 122 in eleven, twelve, or more forward speed torque ratios and at least one reverse speed or torque ratio. Each forward and reverse speed or torque ratio is attained by engagement of one or more of the torque-transmitting mechanisms (i.e. first clutch 126, second clutch 128, third clutch 130, first brake 132, second brake 134, third brake 136, and fourth brake 138), as will be explained below.

Like FIG. 3, FIG. 6 is a truth table presenting the various combinations of torque-transmitting mechanisms that are activated or engaged to achieve the various gear states, except that FIG. 6 corresponds to the transmission 110 of FIGS. 4-5 instead of the transmission 10 of FIGS. 1-2. Actual numerical gear ratios of the various gear states are also presented although it should be appreciated that these numerical values are exemplary only and that they may be adjusted over significant ranges to accommodate various applications and operational criteria of the transmission 110. Of course, other gear ratios are achievable depending on the gear diameter, gear teeth count and gear configuration selected.

For example to establish a reverse gear, the first clutch 126 and the second brake 134 are engaged or activated. The first clutch 126 connects the input shaft or member 112 with the fourth shaft or interconnecting member 148. The second brake 134 connects the fifth shaft or interconnecting member 152 with the stationary element or the transmission housing 150 in order to restrict the member 152 from rotating relative to the transmission housing 150, which also restricts the third planetary carrier member 118B and the second ring gear member 116C from rotating relative to the transmission housing 150. Likewise, twelve forward ratios may be achieved through different combinations of clutch and brake engagement, as shown in FIG. 6.

For example, in the clutch tables of both FIG. 3 and FIG. 6, the second brake 34, 134 and the third brake 36, 136 are selectively engageable together to establish a first forward speed ratio between the input and output members that is greater than the speed ratio between the input and output members for second, third, fourth, fifth, sixth, seventh, eighth, ninth, tenth, eleventh, and twelfth forward speed ratios. The first brake 32, 132 and the third brake 36, 136 are selectively engageable together to establish the second forward speed ratio between the input and output members that is less than the first forward speed ratio between the input and output members and greater than the third, fourth, fifth, sixth, seventh, eighth, ninth, tenth, eleventh, and twelfth forward speed ratios between the input and output members. The third brake 36, 136 and the third clutch 30, 130 are selectively engageable together to establish the third forward speed ratio between the input and output members that is less than the first and the second forward speed ratios between the input and output members and greater than the fourth, fifth, sixth, seventh, eighth, ninth, tenth, eleventh and twelfth forward speed ratios between the input and output members.

The third brake 36, 136 and the first clutch 26, 126 are selectively engageable together to establish the fourth forward speed ratio between the input and output members that is less than the first, second, and third forward speed ratios between the input and output members and greater than the fifth, sixth, seventh, eighth, ninth, tenth, eleventh, and twelfth forward speed ratios between the input and output members. The third brake 36, 136 and the second clutch 28, 128 are selectively engageable together to establish the fifth forward speed ratio between the input and output members that is less than the first, second, third, and fourth forward speed ratios between the input and output members and greater than the sixth, seventh, eighth, ninth, tenth, eleventh, and twelfth forward speed ratios between the input and output members. In the variation illustrated in FIGS. 3 and 6, the first, second, third, fourth, and fifth forward speed ratios are underdrive speed ratios between the input member and the output member, however, other variations could alternatively be used.

In both FIGS. 3 and 6, the first and second clutches 26, 126, 28, 128 are selectively engageable together to establish the sixth forward speed ratio between the input and output members that is less than the first, second, third, fourth, and fifth forward speed ratios between the input and output members and greater than the seventh, eighth, ninth, tenth, eleventh, and twelfth forward speed ratios between the input and output members. The sixth forward speed ratio is 1:1 between the input member and the output member in this variation, however, it should be understand that the sixth forward speed ratio could alternatively be an underdrive or overdrive speed ratio.

The second and fourth brakes 34, 134, 38, 138 are selectively engageable together to establish the seventh forward speed ratio between the input and output members that is less than the first, second, second, third, fourth, fifth, and sixth forward speed ratios between the input and output members and greater than the eighth, ninth, tenth, eleventh, and twelfth forward speed ratios between the input and output members. The first brake 32, 132 and the second clutch 28, 128 are selectively engageable together to establish the eighth forward speed ratio between the input and output members that is less than the first, second, third, fourth, fifth, sixth, and seventh forward speed ratios between the input and output members and greater than the ninth, tenth, eleventh, and twelfth forward speed ratios between the input and output members. The fourth brake 38, 138 and the second clutch 28, 128 are selectively engageable together to establish the ninth forward speed ratio between the input and output members that is less than the first, second, third, fourth, fifth, sixth, seventh, and eighth forward speed ratios between the input and output members and greater than the tenth, eleventh, and twelfth forward speed ratios between the input and output members.

The first brake 32, 132 and the fourth brake 38, 138 are selectively engageable together to establish the tenth forward speed ratio between the input and output members that is less than the first, second, third, fourth, fifth, sixth, seventh, eighth, and ninth forward speed ratios between the input and output members and greater than the eleventh and the twelfth forward speed ratios between the input and output members. The fourth brake 38, 138 and the first clutch 26, 126 are selectively engageable together to establish the eleventh forward speed ratio between the input and output members that is less than the first, second, third, fourth, fifth, sixth, seventh, eighth, ninth, and tenth forward speed ratios between the input and output members and greater than the twelfth forward speed ratio between the input and output members. The fourth brake 38, 138 and the third clutch 30, 130 are selectively engageable together to establish the twelfth forward speed ratio between the input and output members that is less than the first, second, third, fourth, fifth, sixth, seventh, eighth, ninth, tenth, and eleventh forward speed ratios between the input and output members. In FIGS. 3 and 6, the seventh, eighth, ninth, tenth, eleventh, and twelfth forward speed ratios are overdrive speed ratios between the input and output members, however, underdrive or direct drive speed ratios could alternatively be used.

It will be appreciated that the foregoing explanation of operation and gear states of the transmissions 10, 110 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third, and fourth planetary gear sets each having first, second, and third members;
   a first interconnecting member continuously interconnecting the third member of the first planetary gear set with the third member of the fourth planetary gear set;
   a second interconnecting member continuously interconnecting the second member of the first planetary gear set with the third member of the third planetary gear set;
   a third interconnecting member continuously interconnecting the first member of the first planetary gear set with the second member of the second planetary gear set;
   a fourth interconnecting member continuously interconnecting the third member of the second planetary gear set with the second member of the third planetary gear set;
   a fifth interconnecting member continuously interconnecting the first member of the second planetary gear set with the second member of the fourth planetary gear set; and
   seven torque transmitting mechanisms each selectively engageable to interconnect at least one of the first, second, and third members with at least one other of the first, second, third members and a stationary member, and
   wherein the seven torque transmitting mechanisms are selectively engageable in combinations of at least two to establish at least eleven forward speed ratios and at least one reverse speed ratio between the input member and the output member.

2. The transmission of claim 1 wherein a first of the seven torque transmitting mechanisms is selectively engageable to interconnect the first member of the third planetary gear set with the input member, the second member of the fourth planetary gear set, and the first member of the second planetary gear set.

3. The transmission of claim 2 wherein a second of the seven torque transmitting mechanisms is selectively engageable to interconnect the third member of the second planetary gear set and the second member of the third planetary gear set with the input member, the second member of the fourth planetary gear set, and the first member of the second planetary gear set.

4. The transmission of claim 3 wherein a third of the seven torque transmitting mechanisms is selectively engageable to interconnect the first member of the third planetary gear set with the stationary member.

5. The transmission of claim 4 wherein a fourth of the seven torque transmitting mechanisms is selectively engageable to interconnect the second member of the third planetary gear set and the third member of the second planetary gear set with the stationary member.

6. The transmission of claim 5 wherein a fifth of the seven torque transmitting mechanisms is selectively engageable to interconnect the third member of the first planetary gear set and the third member of the fourth planetary gear set with the stationary member.

7. The transmission of claim 6 wherein a sixth of the seven torque transmitting mechanisms is selectively engageable to interconnect the first member of the fourth planetary gear set with the stationary member.

8. The transmission of claim 7 wherein the input member is continuously connected for common rotation with the second member of the fourth planetary gear set and the first member of the second planetary gear set.

9. The transmission of claim 8 wherein the output member is continuously connected for common rotation with the second member of the first planetary gear set and the third member of the third planetary gear set.

10. The transmission of claim 9 wherein the third member of the first planetary gear set, the third member of the fourth planetary gear set, the first member of the second planetary gear set, and the first member of the third planetary gear set are sun gear members; wherein the second members of the first, second, third, and fourth planetary gear sets are planetary gear carrier members; and wherein the first member of the first planetary gear set, the first member of the fourth planetary gear set, the third member of the second planetary gear set, and the third member of the third planetary gear set are ring gear members.

11. The transmission of claim 10 wherein the first, second, third, and fourth planetary gear sets are simple planetary gear sets.

12. The transmission of claim 10 wherein a seventh of the seven torque transmitting mechanisms is selectively engageable to interconnect the third member of the third planetary gear set and the second member of the first planetary gear set with the second member of the third planetary gear set and the third member of the second planetary gear set.

13. The transmission of claim 10 wherein a seventh of the seven torque transmitting mechanisms is selectively engageable to interconnect the first member of the third planetary gear set with the second member of the third planetary gear set and the third member of the second planetary gear set.

14. The transmission of claim 10 wherein the fourth and the fifth torque transmitting mechanisms are selectively engageable together to establish a first forward speed ratio between the input and output members that is greater than the speed ratio between the input and output members for second, third, fourth, fifth, sixth, seventh, eighth, ninth, tenth, eleventh, and twelfth forward speed ratios; wherein the third and the fifth torque transmitting mechanisms are selectively engageable together to establish the second forward speed ratio between the input and output members that is less than the first forward speed ratio between the input and output members and greater than the third, fourth, fifth, sixth, seventh, eighth, ninth, tenth, eleventh, and twelfth forward speed ratios between the input and output members; and wherein the fifth and the seventh torque transmitting mechanisms are selectively engageable together to establish the third forward speed ratio between the input and output members that is less than the first and the second forward speed ratios between the input and output members and greater than the fourth, fifth, sixth, seventh, eighth, ninth, tenth, eleventh and twelfth forward speed ratios between the input and output members.

15. The transmission of claim 14 wherein the first and the fifth torque transmitting mechanisms are selectively engageable together to establish the fourth forward speed ratio between the input and output members that is less than the first, second, and third forward speed ratios between the input and output members and greater than the fifth, sixth, seventh, eighth, ninth, tenth, eleventh, and twelfth forward speed ratios between the input and output members; wherein the second and the fifth torque transmitting mechanisms are selectively engageable together to establish the fifth forward speed ratio between the input and output members that is less than the first, second, third, and fourth forward speed ratios between the input and output members and greater than the sixth, seventh, eighth, ninth, tenth, eleventh, and twelfth forward speed ratios between the input and output members; and wherein the first and the second torque transmitting mechanisms are selectively engageable together to establish the sixth forward speed ratio between the input and output members that is less than the first, second, third, fourth, and fifth forward speed ratios between the input and output members and greater than the seventh, eighth, ninth, tenth, eleventh, and twelfth forward speed ratios between the input and output members.

16. The transmission of claim 15 wherein the fourth and the sixth torque transmitting mechanisms are selectively engageable together to establish the seventh forward speed ratio between the input and output members that is less than the first, second, second, third, fourth, fifth, and sixth forward speed ratios between the input and output members and greater than the eighth, ninth, tenth, eleventh, and twelfth forward speed ratios between the input and output members; wherein the second and the third torque transmitting mechanisms are selectively engageable together to establish the eighth forward speed ratio between the input and output members that is less than the first, second, third, fourth, fifth, sixth, and seventh forward speed ratios between the input and output members and greater than the ninth, tenth, eleventh, and twelfth forward speed ratios between the input and output members; and wherein the second and the sixth torque transmitting mechanisms are selectively engageable together to establish the ninth forward speed ratio between the input and output members that is less than the first, second, third, fourth, fifth, sixth, seventh, and eighth forward speed ratios between the input and output members and greater than the tenth, eleventh, and twelfth forward speed ratios between the input and output members.

17. The transmission of claim 16 wherein the third and the sixth torque transmitting mechanisms are selectively engageable together to establish the tenth forward speed ratio between the input and output members that is less than the first, second, third, fourth, fifth, sixth, seventh, eighth, and ninth forward speed ratios between the input and output members and greater than the eleventh and the twelfth forward speed ratios between the input and output members; wherein the first and the sixth torque transmitting mechanisms are selectively engageable together to establish the eleventh forward speed ratio between the input and output members that is less than the first, second, third, fourth, fifth, sixth, seventh, eighth, ninth, and tenth forward speed ratios between the input and output members and greater than the twelfth forward speed ratio between the input and output members; and wherein the sixth and the seventh torque transmitting mechanisms are selectively engageable together to establish the twelfth forward speed ratio between the input and output members that is less than the first, second, third, fourth, fifth, sixth, seventh, eighth, ninth, tenth, and eleventh forward speed ratios between the input and output members.

18. The transmission of claim 10 wherein the seventh, eighth, ninth, tenth, eleventh, and twelfth forward speed ratios are overdrive speed ratios between the input and output members, the sixth forward speed ratio is 1:1 between the input member and the output member, and the first, second, third, fourth, and fifth forward speed ratios are underdrive speed ratios between the input member and the output member.

19. A transmission comprising:
a stationary member;
a first planetary gear set having a first sun gear member, a first planetary gear carrier member, and a first ring gear member;
a second planetary gear set having a second sun gear member, a second planetary gear carrier member, and a second ring gear member;
a third planetary gear set having a third sun gear member, a third planetary gear carrier member, and a third ring gear member;
a fourth planetary gear set having a fourth sun gear member, a fourth planetary gear carrier member, and a fourth ring gear member;
an input member continuously connected for common rotation with the second sun gear member and the fourth planetary gear carrier member;
an output member continuously connected for common rotation with the first planetary gear carrier member and the third ring gear member;

a first interconnecting member continuously interconnecting the first sun gear member with the fourth sun gear member;

a second interconnecting member continuously interconnecting the first ring gear member with the second planetary gear carrier member;

a third interconnecting member continuously interconnecting the second ring gear member with the third planetary gear carrier member;

a first clutch selectively engageable to interconnect the third sun gear member with the input member, the second sun gear member, and the fourth planetary gear carrier member;

a second clutch selectively engageable to interconnect the third planetary gear carrier member and the second ring gear member with the input member, the second sun gear member, and the fourth planetary gear carrier member;

a third clutch selectively engageable to interconnect the third planetary gear carrier member and the second ring gear member with the output member, the third ring gear member, and the first planetary gear carrier member;

a first brake selectively engageable to interconnect the third sun gear member with the stationary member;

a second brake selectively engageable to interconnect the third planetary gear carrier member and the second ring gear member with the stationary member;

a third brake selectively engageable to interconnect the first sun gear member and the fourth sun gear member with the stationary member; and a fourth brake selectively engageable to interconnect the fourth ring gear member with the stationary member, wherein the first, second, and third clutches and the first, second, third, and fourth brakes are selectively engageable in combinations of at least two to establish at least twelve forward speed ratios and at least one reverse speed ratio between the input member and the output member.

20. A transmission comprising:

a stationary member;

a first planetary gear set having a first sun gear member, a first planetary gear carrier member, and a first ring gear member;

a second planetary gear set having a second sun gear member, a second planetary gear carrier member, and a second ring gear member;

a third planetary gear set having a third sun gear member, a third planetary gear carrier member, and a third ring gear member;

a fourth planetary gear set having a fourth sun gear member, a fourth planetary gear carrier member, and a fourth ring gear member;

an input member continuously connected for common rotation with the second sun gear member and the fourth planetary gear carrier member;

an output member continuously connected for common rotation with the first planetary gear carrier member and the third ring gear member;

a first interconnecting member continuously interconnecting the first sun gear member with the fourth sun gear member;

a second interconnecting member continuously interconnecting the first ring gear member with the second planetary gear carrier member;

a third interconnecting member continuously interconnecting the second ring gear member with the third planetary gear carrier member;

a first clutch selectively engageable to interconnect the third sun gear member with the input member, the second sun gear member, and the fourth planetary gear carrier member;

a second clutch selectively engageable to interconnect the third planetary gear carrier member and the second ring gear member with the input member, the second sun gear member, and the fourth planetary gear carrier member;

a third clutch selectively engageable to interconnect the third planetary gear carrier member and the second ring gear member with the third sun gear member;

a first brake selectively engageable to interconnect the third sun gear member with the stationary member;

a second brake selectively engageable to interconnect the third planetary gear carrier member and the second ring gear member with the stationary member;

a third brake selectively engageable to interconnect the first sun gear member and the fourth sun gear member with the stationary member; and a fourth brake selectively engageable to interconnect the fourth ring gear member with the stationary member, wherein the first, second, and third clutches and the first, second, third, and fourth brakes are selectively engageable in combinations of at least two to establish at least twelve forward speed ratios and at least one reverse speed ratio between the input member and the output member.

\* \* \* \* \*